United States Patent
Prasad Nittur et al.

(10) Patent No.: US 11,212,292 B2
(45) Date of Patent: Dec. 28, 2021

(54) NETWORK ACCESS CONTROL AUTHORIZATION PROCESS CHAINING

(71) Applicant: HEWLETT PACKARD ENTERPRISE DEVELOPMENT LP, Houston, TX (US)

(72) Inventors: Bhagya Prasad Nittur, Santa Clara, CA (US); Anoop Kumaran Nair, Mumbai (IN); Antoni Milton, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 16/458,805

(22) Filed: Jul. 1, 2019

(65) Prior Publication Data
US 2021/0006564 A1    Jan. 7, 2021

(51) Int. Cl.
*H04L 29/06*    (2006.01)

(52) U.S. Cl.
CPC ........ *H04L 63/105* (2013.01); *H04L 63/0884* (2013.01)

(58) Field of Classification Search
CPC .......................... H04L 63/105; H04L 63/0884
USPC ........................................................... 726/4
See application file for complete search history.

(56) References Cited

U.S. PATENT DOCUMENTS

| | | | |
|---|---|---|---|
| 9,326,139 B2 | 4/2016 | Johan | |
| 2003/0074583 A1* | 4/2003 | Habegger | H04L 63/205 726/4 |
| 2011/0219439 A1 | 9/2011 | Strode et al. | |
| 2015/0371031 A1* | 12/2015 | Ueno | G06F 21/45 726/4 |
| 2020/0104473 A1* | 4/2020 | Yu | H04L 63/102 |
| 2020/0213290 A1* | 7/2020 | Tan | H04L 47/78 |

OTHER PUBLICATIONS

Cui et al., "Lightweight Management of Authorization Update on Cloud Data", 19th IEEE International Conference on Parallel and Distributed Systems 1521-9097/13 $31.00 ©2013 IEEE DOI 10.1109/.82 (Year: 2013).*

(Continued)

*Primary Examiner* — Khalil Naghdali
(74) *Attorney, Agent, or Firm* — Sheppard Mullin Richter & Hampton LLP

(57) ABSTRACT

Systems and methods are provided for chaining network access control authorization processes. A method includes executing a first authorization process to generate a first authorization result for a user according to first authorization data obtained from a first authorization source corresponding to the first authorization process; executing a second authorization process to generate a second authorization result for the user according to second authorization data obtained from a second authorization source corresponding to the second authorization process and the first authorization data obtained by the first authorization process; and authorizing the user to access a network resource according to the first authorization result generated by the first authorization process and the second authorization result generated by the second authorization process.

20 Claims, 6 Drawing Sheets

(56) References Cited

OTHER PUBLICATIONS

Polito et al., "Authentication and Authorization Method in Multidomain, Multi-provider Networks", 2007 IEEE, pp. 174-181 (Year: 2007).*
Authentication Chaining, (Web Page), Retrieved Jan. 21, 2019, 4 Pgs, BMC Software Inc.
CA Single Sign-On—12.7, (Web Page), Dec. 6, 2018, 3 Pgs, Broadcom.
OpenAm 12 Administration Guide, (Web Page), Retrieved Jan. 18, 2019, 380 Pgs, ForgeRock.

* cited by examiner

COMPUTING COMPONENT 500

HARDWARE PROCESSORS 502

MACHINE-READABLE STORAGE MEDIA 504

EXECUTING A FIRST AUTHORIZATION PROCESS TO GENERATE A FIRST AUTHORIZATION RESULT FOR A USER ACCORDING TO FIRST AUTHORIZATION DATA OBTAINED FROM A FIRST AUTHORIZATION SOURCE CORRESPONDING TO THE FIRST AUTHORIZATION PROCESS 506

EXECUTING A SECOND AUTHORIZATION PROCESS TO GENERATE A SECOND AUTHORIZATION RESULT FOR THE USER ACCORDING TO SECOND AUTHORIZATION DATA OBTAINED FROM A SECOND AUTHORIZATION SOURCE CORRESPONDING TO THE SECOND AUTHORIZATION PROCESS AND THE FIRST AUTHORIZATION DATA OBTAINED BY THE FIRST AUTHORIZATION PROCESS 508

AUTHORIZING THE USER TO ACCESS A NETWORK RESOURCE ACCORDING TO THE FIRST AUTHORIZATION RESULT GENERATED BY THE FIRST AUTHORIZATION PROCESS AND THE SECOND AUTHORIZATION RESULT GENERATED BY THE SECOND AUTHORIZATION PROCESS 510

EXECUTING A THIRD AUTHORIZATION PROCESS TO GENERATE A THIRD AUTHORIZATION RESULT FOR THE USER ACCORDING TO THIRD AUTHORIZATION DATA OBTAINED FROM A THIRD AUTHORIZATION SOURCE CORRESPONDING TO THE THIRD AUTHORIZATION PROCESS 512

AUTHORIZING THE USER TO ACCESS A NETWORK RESOURCE ACCORDING TO THE FIRST AUTHORIZATION RESULT GENERATED BY THE FIRST AUTHORIZATION PROCESS, THE SECOND AUTHORIZATION RESULT GENERATED BY THE SECOND AUTHORIZATION PROCESS, AND THE THIRD AUTHORIZATION RESULT GENERATED BY THE THIRD AUTHORIZATION PROCESS 514

FIG. 5

NETWORK ACCESS CONTROL AUTHORIZATION PROCESS CHAINING

DESCRIPTION OF RELATED ART

The disclosed technology relates generally to data communication networks, and more particularly some embodiments relate to managing network access in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 is a block diagram of an example computing component or device for network access control authorization process chaining in accordance with one embodiment.

The figures are not exhaustive and do not limit the present disclosure to the precise form disclosed.

DETAILED DESCRIPTION

Authorization is a crucial part of the enforcement of network access control policies. In current enterprise networks, authorization of a user may require multiple authorization processes, each requiring the consultation of a different authorization source, for example such as Active Directory, Lightweight Directory Access Protocol (LDAP), Structured Query Language (SQL) databases, a remote Remote Authentication Dial-In User Service (RADIUS) server, web-based authorization sources, and the like. Today, these authorization processes are executed in parallel. This provides no opportunity for one authorization process to use the authorization data obtained by another authorization process.

In embodiments of the disclosure, authorization processes may be chained, that is, executed in serial fashion, such that one authorization process may use data obtained by another authorization process. For example, an authorization process using a SQL database may depend on the output of an Active Directory authorization process. Information obtained during an Active Directory authorization may be verified through comparison with information provided by a SQL database. The information may include, for example, domain names, email addresses, other identifiers, and the like. Other authorization processes may be performed in parallel with such chained authorization processes.

Figure 1:
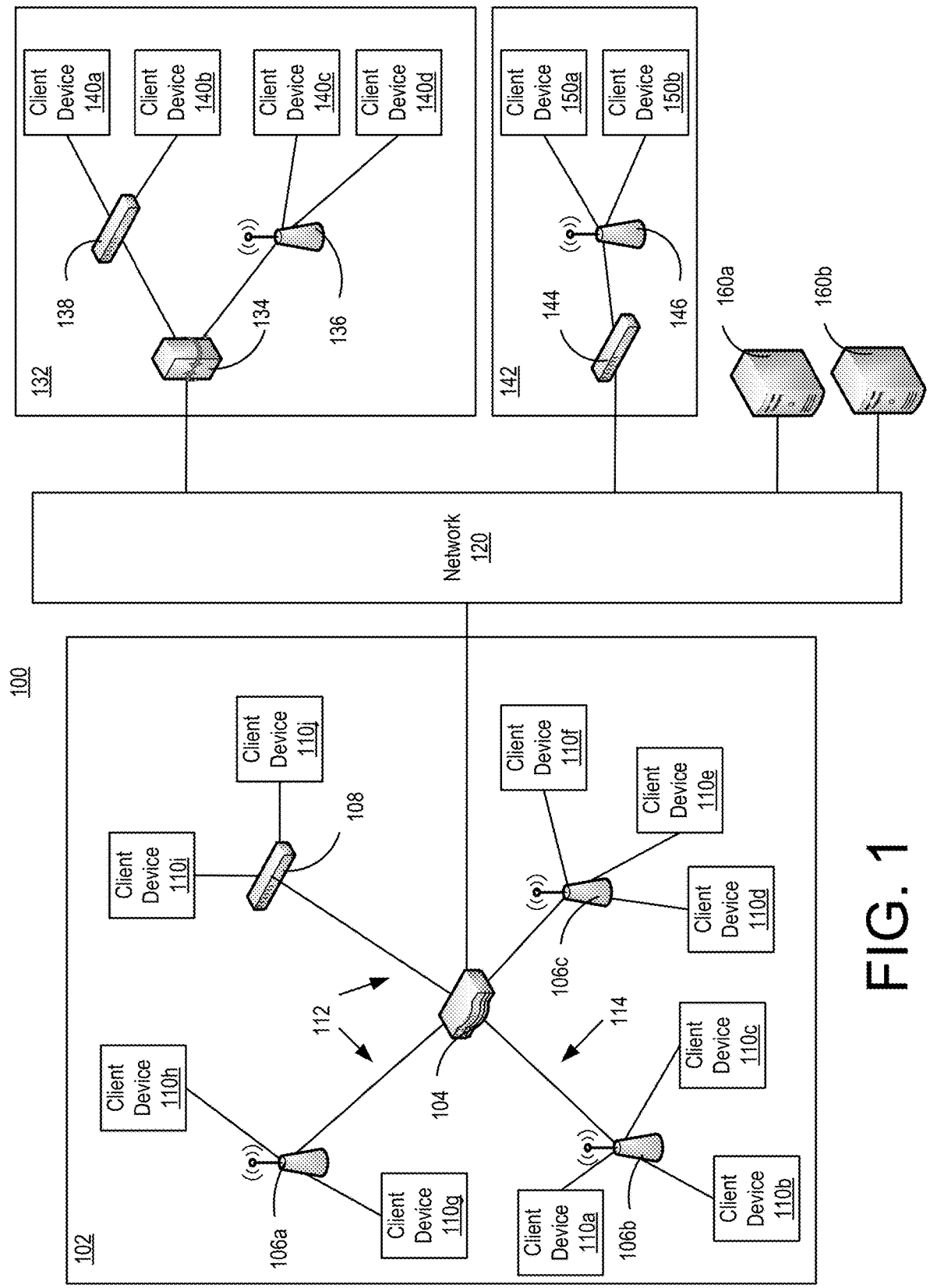
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or other network devices in communication with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of network devices and servers may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a j*, 140*a-d*, 150*a-b* may request and access the multimedia content provided by the content servers 160*a-b*.

Figure 2:
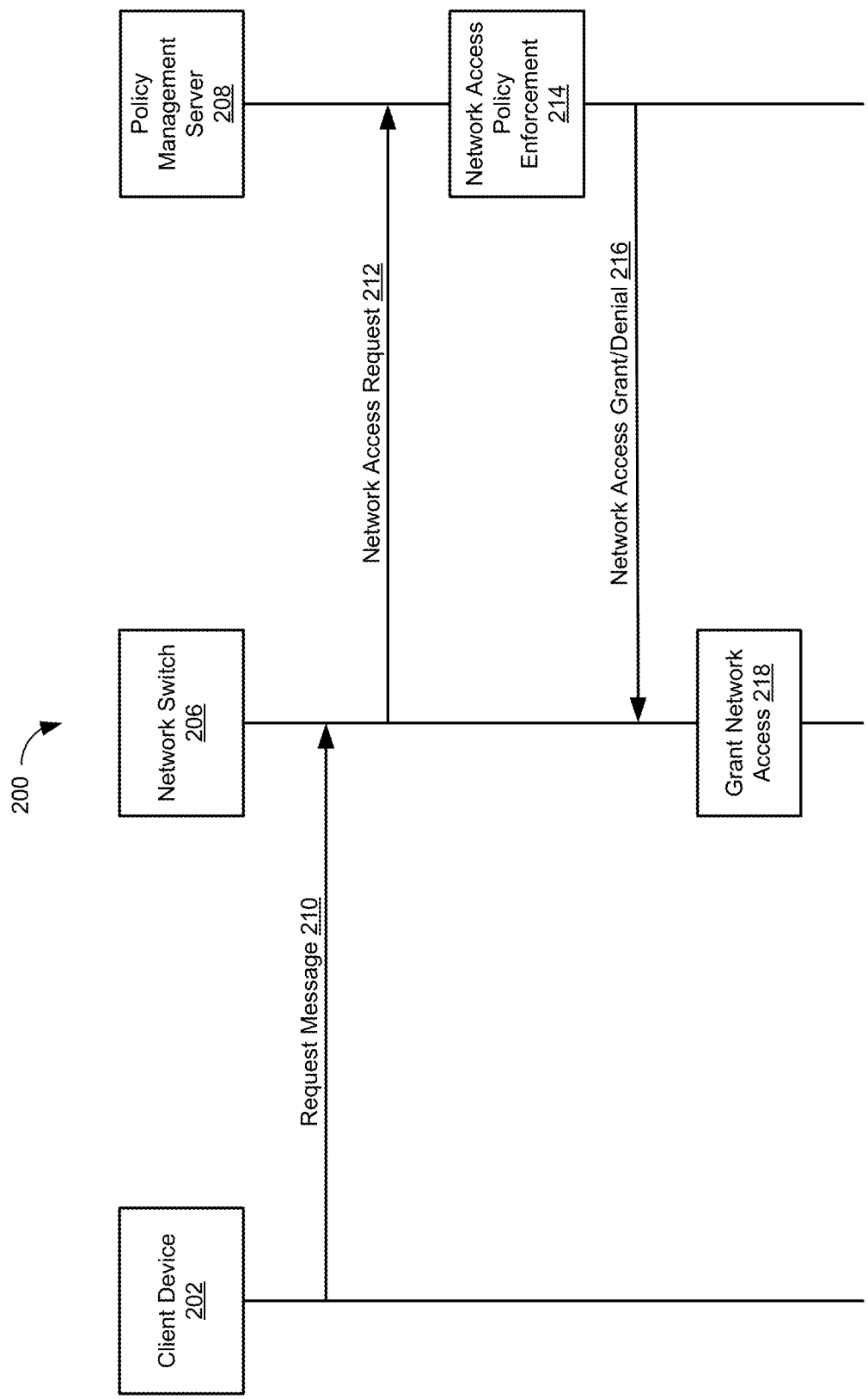
FIG. 2 illustrates a portion of a network in which embodiments of the disclosed technology may be implemented.

FIG. 2 illustrates a portion of a network in which embodiments of the disclosed technology may be implemented. Referring to FIG. 2, the network 200 may include a client device 202. The client device 202 may be implemented as a desktop computer, laptop computer, smart phone, tablet, or the like. A user may employ the client device 202 to request access to the network 200, to a particular resource in the network 200, or the like. For example, the user may employ the client device 202 to attempt to access a word processing application hosted within the network 200. Accordingly, the client device 202 may transmit a request message 210 to network device 206.

The network 200 may include a network device such as a network switch 206. In other embodiments, the network switch 206 may be replaced by other network devices, such as a device executing a network access server, or the like. The network switch 206 may receive the request message 210 transmitted by the client device 202.

The network switch 206 operates according to network access control policies. The network 200 may include a policy management server 208. The policy management server 208 controls network access control policies for the network 200. Accordingly, upon receiving request message 210 from client device 202, to determine whether the user of the client device 202 may access the requested network or network resource, the network switch 206 may transmit a network access request message 212 to the policy management server 208. The network access request message 212 may specify the network or network resources requested by the user of the client device 202. The network access request message 212 may be the same as the request message 210, or may be a message that is specific to the communication between the network switch 206 and the policy management server 208.

Responsive to receiving the network access request message 212, the policy management server 208 may perform network access policy enforcement, at 214. The network access policy enforcement may include authentication, authorization, accounting, and the like. The authorization may include one or more authorization processes, as described in detail below. Upon determining that access to the requested network or network resources should be, or should not be, granted to the user of the client device 202, the policy management server 208 may transmit a network access grant/denial message 216 to the network switch 206. Responsive to receiving a network access grant/denial message 216 that grants network access, the network switch 206 may grant access to the user of the client device 202 for the requested network or network resources.

Figure 3:
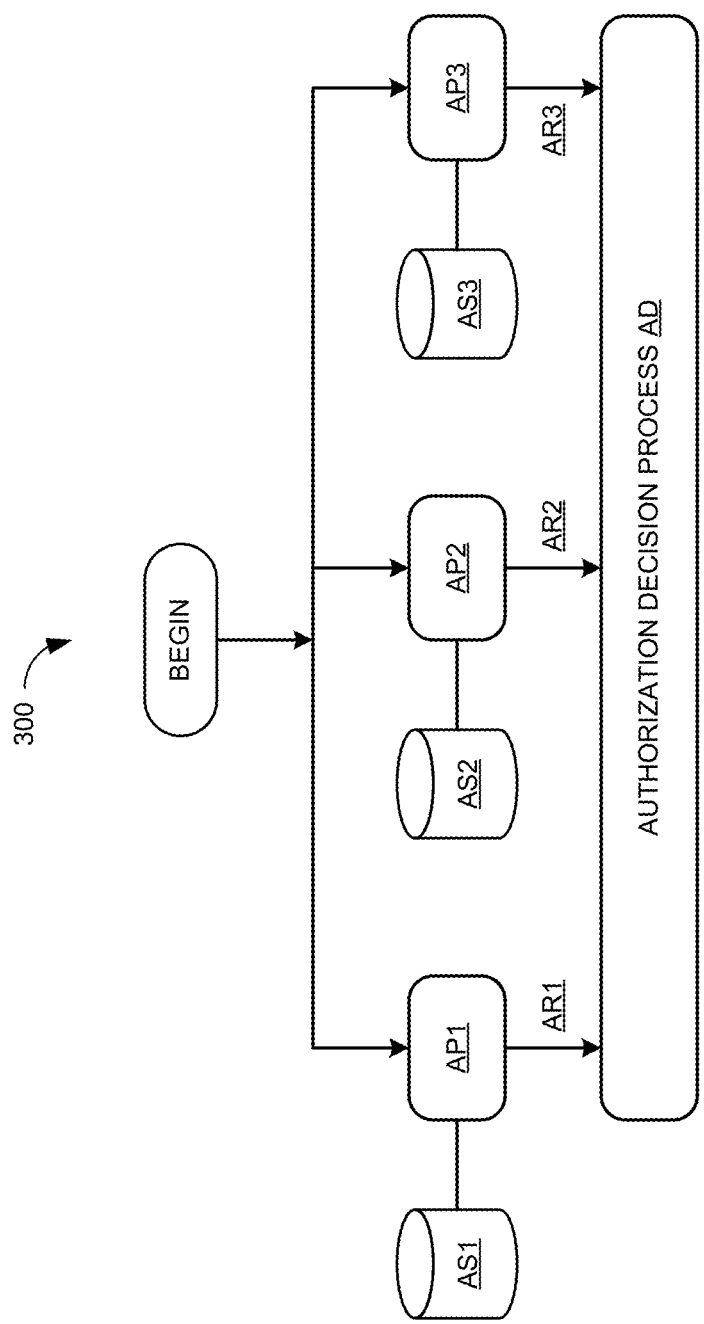
FIG. 3 illustrates a conventional network access authorization process.

FIG. 3 illustrates a conventional network access authorization process. Referring to FIG. 3, the network access authorization process 300 includes three authorization processes AP1, AP2, and AP3. Each authorization process AP employs a respective authorization source AS. In FIG. 3, the three authorization processes AP1, AP2, and AP3 employ three authorization sources AS1, AS2, and AS3, respectively. When the network access authorization process 300 begins, the three authorization processes AS1, AS2, and AS3 execute in parallel, that is, concurrently and independently of one another. Each authorization process AP obtains authorization data from a respective authorization source AS, and provides the respective authorization result AR. That is, the three authorization processes AP1, AP2, and AP3 provide three independent authorization results AR1, AR2, and AR3, respectively. That is, each authorization result AR depends only on the respective authorization process AP, and not on any other authorization process, or any authorization data obtained in any other authorization process AP.

An authorization decision process AD receives the three independent authorization results AR1, AR2, and AR3, and makes an authorization decision based on those authorization results AR1, AR2, and AR3. The authorization decision may be to grant access to the requested network resources, deny access to the requested network resources, grant limited access to the requested network resources, and the like.

One significant limitation of conventional network access authorization processes is evident from the example of FIG. 3. Because the authorization processes AP executed in parallel, they cannot share authorization data. That is, authorization data obtained by one authorization process AP from its authorization source AS cannot be used by any other authorization process AP.

Figure 4:
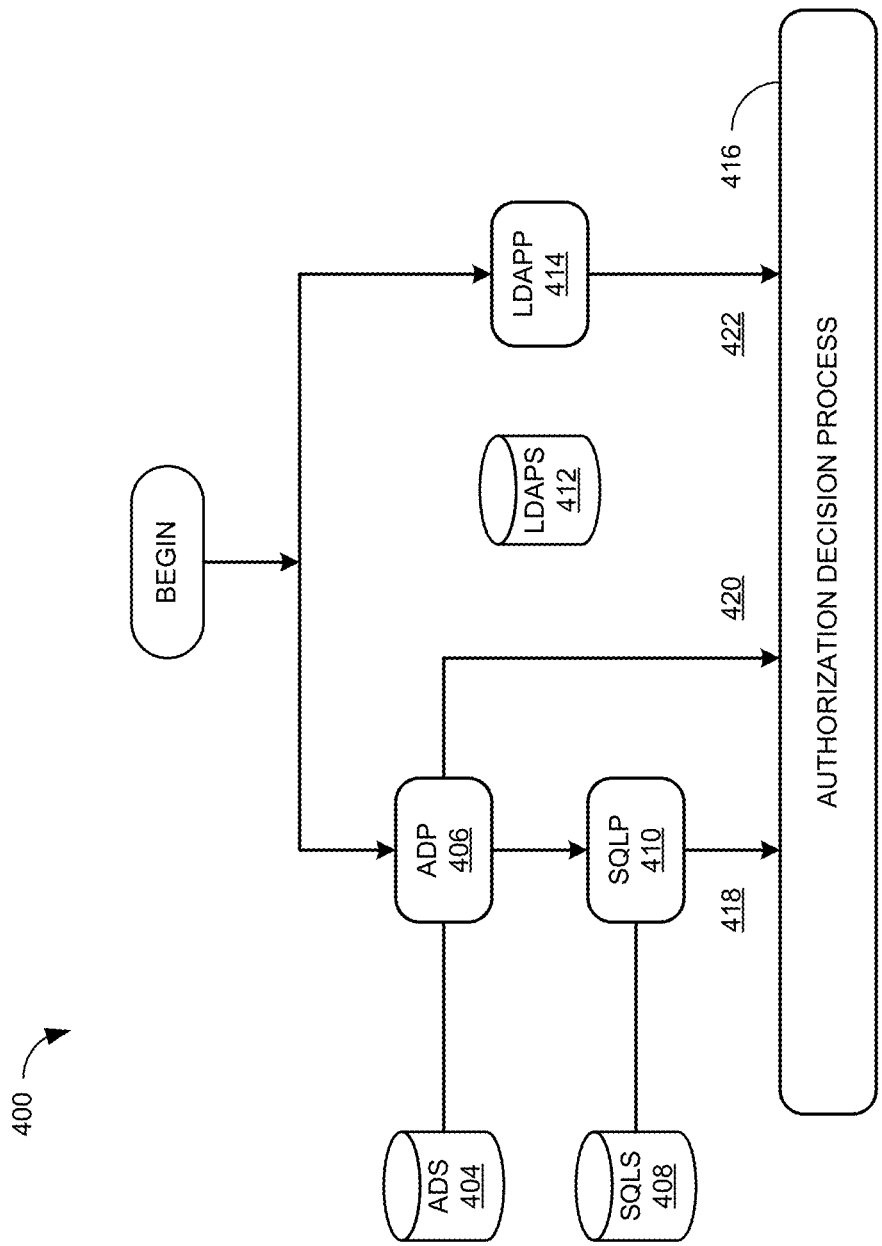
FIG. 4 illustrates a network access authorization process according to embodiments of the disclosed technology.

FIG. 4 illustrates a network access authorization process according to embodiments of the disclosed technology. Referring to FIG. 4, the network access authorization process 400 includes three authorization processes, each having a respective authorization source. One of the authorization processes is an Active Directory process 406. The Active Directory process 406 employs an Active Directory database 404 as an authorization resource. Another of the authorization processes is a structured query language (SQL) process 410. The SQL process employs a SQL database 408 as an authorization resource. Another of the authorization processes is a lightweight directory access protocol (LDAP) process 414. The LDAP process employs an LDAP database 412 as an authorization resource.

In the network access authorization process 400 of FIG. 4, two of the authorization processes have been chained. Two processes are chained when one process depends on another. In particular, the SQL authorization process 410 depends on the Active Directory authorization process 406. That is, the SQL authorization process 410 employ some or all of the authorization data obtained by the Active Directory authorization process 406 from the Active Directory database 404. In the example of FIG. 4, the authorization data obtained from the Active Directory database 404 by the Active Directory authorization process 406 may include, for example, domain names, email addresses, other identifiers, and the like.

In the example of FIG. 4, the Active Directory authorization process 406 may provide information to the SQL authorization process 410. The SQL authorization process 410 may employ the information to generate its authorization result 418. For example, the SQL authorization process 410 may obtain information from the SQL database 408 that may include, for example, domain names, email addresses, other identifiers, and the like. The SQL authorization process 410 may include a comparison of this information against the information provided by the Active Directory authorization process 406. The SQL authorization result 418 may be generated based, at least in part, on this comparison.

Continuing the example of FIG. 4, each authorization process provides an authorization result. The Active Directory authorization process 406 provides an authorization result 420. The SQL authorization process 410 provides an authorization result 418. The LDAP authorization process provides an authorization result 422. Each authorization result may include authorization granted, authorization denied, a conditional authorization, a level of authorization, or the like, or some combination thereof.

An authorization decision process 416 receives the three authorization results 418, 420, and 422, and makes an authorization decision based on those authorization results 418, 420, and 422. The authorization decision may be to grant access to the requested network resources, deny access to the requested network resources, grant limited access to the requested network resources, and the like.

Embodiments of the network access authorization process 400 may be implemented to provide advantages over conventional solutions. For example, because the authorization processes may be chained, they can share authorization data. That is, authorization data obtained by one authorization process from its authorization source may be used by one or more other authorization processes. In the example of FIG. 4, the media access control address MAC obtained by the Active Directory authorization process 406 from the Active Directory authorization source 404 may be used by the SQL authorization process 410. Other authorization processes may execute in parallel with the chained authorization processes. In the example of FIG. 4, the LDAP authorization process 414 may execute in parallel with the chained authorization processes 406 and 410.

In the example of FIG. 4, authorization processes of different types are chained. But in other embodiments, authorization processes of the same type may be chained. For example, two SQL authorization processes may be chained. Furthermore, chains may include multiple authorization processes of the same type as well as authorization processes of other types. For example, a chain may include two multiple authorization processes as well as an Active Directory authorization process.

With embodiments of the disclosed technology, network engineers may design complex network access authorization process that may include multiple chained authorization processes, multiple parallel processes, which may include chained authorization processes, and the like. Network engineers may design elaborate dependency tree structures to implement these complex network access authorization processes. These dependency tree structures may be employed to generate or modify state machines for implementing the network access authorization processes. The dependency trees may determine the order of execution of the authorization processes. Each level of the dependency tree may be queried only after previous levels have completed.

The disclosed technology may be applied to other areas of network access control policy enforcement as well. For example, the disclosed technology may be employed to chain authentication processes and the like. In particular, the disclosed technology may be employed to generate dependency tree structures and state machines for authentication processes and the like.

FIG. 5 is a block diagram of an example computing component or device 500 for network access control authorization process chaining in accordance with one embodiment. Computing component 500 may be, for example, a server computer, a controller, or any other similar computing component capable of processing data. In the example implementation of FIG. 5, the computing component 500 includes a hardware processor 502, and machine-readable storage medium 504.

In some embodiments, computing component 500 may be an embodiment of the network switch 206 of FIG. 2, the policy management server 208 of FIG. 2, or some combination thereof.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-514, to control processes or operations for network access control authorization process chaining. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processor 502 may execute instruction 506 to perform executing a first authorization process to generate a first authorization result for the user according to first authorization data obtained from a first authorization source corresponding to the first authorization process. In the example of FIG. 4, the first authorization process may be the Active Directory authorization process ADP, the first authorization source may be the Active Directory database ADS, the first authorization data may include the media access control address MAC, and the first authorization result may be the Active Directory authorization result ADR.

Hardware processor 502 may execute instruction 508 to perform executing a second authorization process to generate a second authorization result for the user according to second authorization data obtained from a second authorization source corresponding to the second authorization process and the first authorization data obtained by the first authorization process. Continuing the example of FIG. 4, the second authorization process may be the SQL authorization process SQLP, the second authorization source may be the SQL database SQLS, the second authorization data may include one or more media access control addresses, and the second authorization results may be the SQL authorization result SQLR. In the example of FIG. 4, the first authorization data may include the media access control address MAC.

It is important to note that the second authorization process is performed not only according to the second authorization data obtained from the second authorization source corresponding to the second authorization process, but also according to the first authorization data obtained by the first authorization process from the first authorization source corresponding to the first authorization process. In the example of FIG. 4, the SQL authorization process SQLP is performed not only according to the authorization data obtained from the SQL authorization source SQLS, but also according to the media access control address MAC obtained by the Active Directory authorization process ADP from the Active Directory authorization source ADS.

Hardware processor 502 may execute instruction 510 to perform authorizing the user to access a network resource according to the first authorization result generated by the first authorization process and the second authorization result generated by the second authorization process. In the example of FIG. 4, the authorization decision process AD performs the authorization based on the authorization results SQLR and ADR.

Hardware processor 502 may execute instruction 512 to perform executing a third authorization process to generate a third authorization result for the user according to third authorization data obtained from a third authorization source corresponding to the third authorization process. In the example of FIG. 4, the LDAP authorization process LDAPP may be performed according to LDAP authorization data obtained from the LDAP authorization source LDAPS to generate an LDAP authorization result LDAPP.

Hardware processor 502 may execute instruction 5014 to perform authorizing the user to access a network resource according to the first authorization result generated by the first authorization process, the second authorization result generated by the second authorization process, and the third authorization result generated by the third authorization process. In the example of FIG. 4, the authorization decision process ADP may authorize the user to access a network resource according to the SQL authorization result SQLR, the Active Directory authorization result ADR, and the LDAP authorization result LDAPR. In the example of FIG. 4, the Active Directory authorization process ADP and the SQL authorization process SQLP are chained, such that the SQL authorization process SQLP depends on authorization data obtained by the Active Directory authorization process ADP from the Active Directory authorization source ADS. In the example of FIG. 4, the LDAP authorization process LDAPP executes in parallel with the chained authorization processes ADP and SQLP. Thus according to embodiments of the disclosed technology, some authorization processes may be chained in series, while other authorization processes may execute in parallel, providing opportunities for network engineers to design flexible authorization processes to more thoroughly authorize users to access network resources.

Figure 6:
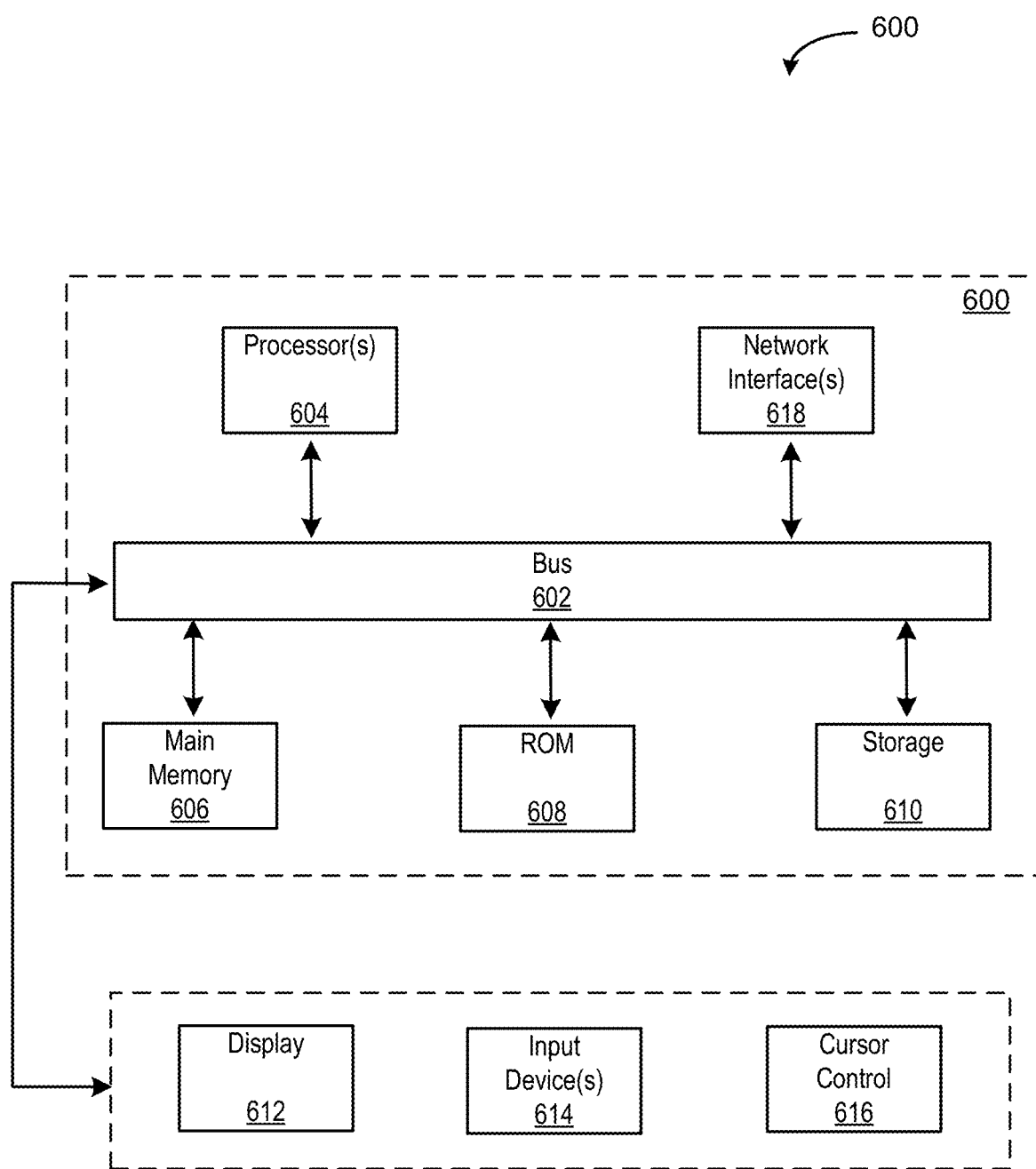
FIG. 6 depicts a block diagram of an example computer system in which embodiments described herein may be implemented.

FIG. 6 depicts a block diagram of an example computer system 600 in which embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 618, which carry the digital data to and from computer system 600, are example forms of transmission media.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a hardware processor; and
   a non-transitory machine-readable storage medium encoded with instructions executable by the hardware processor to perform a method for authorizing a user to access a network resource, the method comprising:
   obtaining first authorization data from a first authorization source corresponding to a first authorization process;
   executing the first authorization process based at least in part on the first authorization data to generate a first authorization result for the user;
   sharing, by the first authorization process, at least a portion of the first authorization data with a second authorization process;
   obtaining second authorization data from a second authorization source corresponding to the second authorization process;
   executing the second authorization process based on the second authorization data and the at least a portion of the first authorization data to generate a second authorization result for the user; and
   authorizing the user to access the network resource according to the first authorization result generated by the first authorization process and the second authorization result generated by the second authorization process.

2. The system of claim 1, the method further comprising:
   executing a third authorization process to generate a third authorization result for the user according to third authorization data obtained from a third authorization source corresponding to the third authorization process; and
   further authorizing the user to access the network resource the third authorization result generated by the third authorization process.

3. The system of claim 1, wherein authorizing the user to access the network resource comprises:
   mapping a role to the user according to a role mapping policy.

4. The system of claim 3, the method further comprising:
   evaluating a client health of a client device employed by the user to seek access to the network resource; and
   determining enforcement profile attributes for the user according to an enforcement policy, the role, and the client health of the client device.

5. The system of claim 4, the method further comprising:
   receiving, at a network switch, a request from the user for access to the network resource, wherein the first and second authorization processes are executed subsequent to receiving the request from the user; and
   providing the enforcement profile attributes for the user to the network switch.

6. The system of claim 5, the method further comprising:
authenticating the user responsive to receiving the request from the user, wherein the first and second authorization processes are executed responsive to authenticating the user.

7. The system of claim 1, wherein the first and second authorization sources comprise at least one of:
Active Directory;
LDAP;
a SQL database;
a RADIUS server; and
a web-based authorization source.

8. A non-transitory machine-readable storage medium encoded with instructions executable by a hardware processor of a computing component, the machine-readable storage medium comprising instructions to cause the hardware processor to perform a method for authorizing a user to access a network resource, the method comprising:
obtaining first authorization data from a first authorization source corresponding to a first authorization process;
executing the first authorization process based at least in part on the first authorization data to generate a first authorization result for the user;
sharing, by the first authorization process, at least a portion of the first authorization data with a second authorization process;
obtaining second authorization data from a second authorization source corresponding to the second authorization process;
executing the second authorization process based on the second authorization data and the at least a portion of the first authorization data to generate a second authorization result for the user; and
authorizing the user to access the network resource according to the first authorization result generated by the first authorization process and the second authorization result generated by the second authorization process.

9. The medium of claim 8, further comprising:
executing a third authorization process to generate a third authorization result for the user according to third authorization data obtained from a third authorization source corresponding to the third authorization process; and
further authorizing the user to access the network resource the third authorization result generated by the third authorization process.

10. The medium of claim 8, wherein authorizing the user to access the network resource comprises:
mapping a role to the user according to a role mapping policy.

11. The medium of claim 10, the method further comprising:
evaluating a client health of a client device employed by the user to seek access to the network resource; and
determining enforcement profile attributes for the user according to an enforcement policy, the role, and the client health of the client device.

12. The medium of claim 11, the method further comprising:
receiving, at a network switch, a request from the user for access to the network resource, wherein the first and second authorization processes are executed subsequent to receiving the request from the user; and
providing the enforcement profile attributes for the user to the network switch.

13. The medium of claim 12, the method further comprising:
authenticating the user responsive to receiving the request from the user, wherein the first and second authorization processes are executed responsive to authenticating the user.

14. The medium of claim 8, wherein the first and second authorization sources comprise at least one of:
Active Directory;
LDAP;
a SQL database;
a RADIUS server; and
a web-based authorization source.

15. A method for authorizing a user to access a network resource, the method comprising:
obtaining first authorization data from a first authorization source corresponding to a first authorization process;
executing the first authorization process based at least in part on the first authorization data to generate a first authorization result for the user;
sharing, by the first authorization process, at least a portion of the first authorization data with a second authorization process;
obtaining second authorization data from a second authorization source corresponding to the second authorization process;
executing the second authorization process based on the second authorization data and the at least a portion of the first authorization data to generate a second authorization result for the user; and
authorizing the user to access the network resource according to the first authorization result generated by the first authorization process and the second authorization result generated by the second authorization process.

16. The method of claim 15, further comprising:
executing a third authorization process to generate a third authorization result for the user according to third authorization data obtained from a third authorization source corresponding to the third authorization process; and
further authorizing the user to access the network resource the third authorization result generated by the third authorization process.

17. The method of claim 15, wherein authorizing the user to access the network resource comprises:
mapping a role to the user according to a role mapping policy;
evaluating a client health of a client device employed by the user to seek access to the network resource; and
determining enforcement profile attributes for the user according to an enforcement policy, the role, and the client health of the client device;
receiving, at a network switch, a request from the user for access to the network resource, wherein the first and second authorization processes are executed subsequent to receiving the request from the user; and
providing the enforcement profile attributes for the user to the network switch.

18. The system of claim 2, the method further comprising:
chaining the first authorization process and the second authorization process such that the first authorization process and the second authorization process execute serially,
wherein the third authorization process is executed in parallel with at least one of the first authorization process or the second authorization process.

19. The system of claim 18, wherein the first authorization process and the second authorization are a same type of authorization process, the method further comprising:
   chaining a fourth authorization process with the first authorization process and the second authorization process,
   wherein the fourth authorization process is a different type of authorization process from the first authorization process and the second authorization process.

20. The system of claim 1, wherein executing the second authorization process comprises comparing the second authorization data against the at least a portion of the first authorization data shared by the first authorization process.

* * * * *